United States Patent
Wasson et al.

(10) Patent No.: US 12,160,494 B2
(45) Date of Patent: Dec. 3, 2024

(54) NON-INTEGER INTERPOLATION FOR SIGNAL SAMPLING AT ASYNCHRONOUS CLOCK RATES

(71) Applicant: BAE SYSTEMS Information and Electronic Systems Integration Inc., Nashua, NH (US)

(72) Inventors: Daniel Wasson, Billerica, MA (US); Anthony J. Crawford, Milford, NH (US); Michael A. Zalucki, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 113 days.

(21) Appl. No.: 18/309,896

(22) Filed: May 1, 2023

(65) Prior Publication Data

US 2024/0372693 A1   Nov. 7, 2024

(51) Int. Cl.
*H04L 7/00*   (2006.01)

(52) U.S. Cl.
CPC .................. *H04L 7/0025* (2013.01)

(58) Field of Classification Search
CPC ..................................... H04L 7/0025
USPC ................. 375/354, 371, 373, 376
See application file for complete search history.

(56) References Cited

U.S. PATENT DOCUMENTS

| | | | |
|---|---|---|---|
| 7,436,910 B2 | 10/2008 | Fudge et al. | |
| 9,025,715 B1 * | 5/2015 | Sutioso | H04L 7/0337 |
| | | | 375/326 |
| 9,057,782 B2 | 6/2015 | Feigin | |
| 9,219,487 B1 | 12/2015 | Stuhlberger et al. | |
| 9,264,219 B1 * | 2/2016 | Kang | H03L 7/093 |
| 9,407,424 B1 | 8/2016 | Holla et al. | |
| 9,791,550 B2 | 10/2017 | Mckitterick et al. | |
| 10,048,354 B2 | 8/2018 | Bharadwaj et al. | |
| 10,177,897 B2 | 1/2019 | Schell et al. | |
| 10,348,347 B2 | 7/2019 | Crawford et al. | |
| 10,495,727 B2 | 12/2019 | Gunn et al. | |

(Continued)

FOREIGN PATENT DOCUMENTS

| | | |
|---|---|---|
| WO | 2014108443 A1 | 7/2014 |
| WO | 2017069843 A1 | 4/2017 |
| WO | 2017134097 A1 | 8/2017 |

*Primary Examiner* — Emmanuel Bayard
(74) *Attorney, Agent, or Firm* — Scott J. Asmus

(57) ABSTRACT

Techniques are provided for non-integer interpolation for signal sampling. A system implementing the techniques according to an embodiment includes a memory configured to store frequency values associated with an input signal sampled at a first clock rate. The system also includes a clock phase detector configured to detect phase alignment between a first clock signal associated with the first clock rate and a second clock signal associated with a second clock rate. The system further includes a read circuit configured to adjust an interpolation time interval in response to the detected phase alignment and to read the frequency values from the memory at the adjusted interpolation time interval. The system further includes a phase accumulator configured to accumulated phase as a sum of the frequency values read from the memory. The system further includes a waveform generator configured to generate an output waveform sample based on the accumulated phase.

20 Claims, 6 Drawing Sheets

(56) References Cited

U.S. PATENT DOCUMENTS

| | | | |
|---|---|---|---|
| 10,651,859 B2 | 5/2020 | Khalid et al. | |
| 2005/0220242 A1* | 10/2005 | Ogasawara | H03L 7/091 |
| | | | 375/376 |
| 2010/0097071 A1* | 4/2010 | Lee | G01R 29/26 |
| | | | 714/704 |
| 2019/0356324 A1* | 11/2019 | Jenkins | H03L 7/1972 |
| 2020/0021277 A1* | 1/2020 | Pi | H03K 5/01 |
| 2022/0209755 A1* | 6/2022 | Sim | H03M 1/66 |
| 2024/0329924 A1* | 10/2024 | Remla | G06F 1/10 |

\* cited by examiner

NON-INTEGER INTERPOLATION FOR SIGNAL SAMPLING AT ASYNCHRONOUS CLOCK RATES

FIELD OF DISCLOSURE

The present disclosure relates to signal interpolation, and more particularly to non-integer interpolation for sampling of signals at asynchronous clock rates.

BACKGROUND

In many applications, for example radar receivers and communication systems, input signals of interest are received and digitized at some desired or convenient sampling rate. These digitized signals may be stored for future use and/or passed along to other applications for additional processing. Depending on the application it may be necessary to resample the signal at a different sampling rate. Resampling can be a complex and computationally expensive process when the resample rate is not an integer multiple of the original sampling rate.

Figure 1:
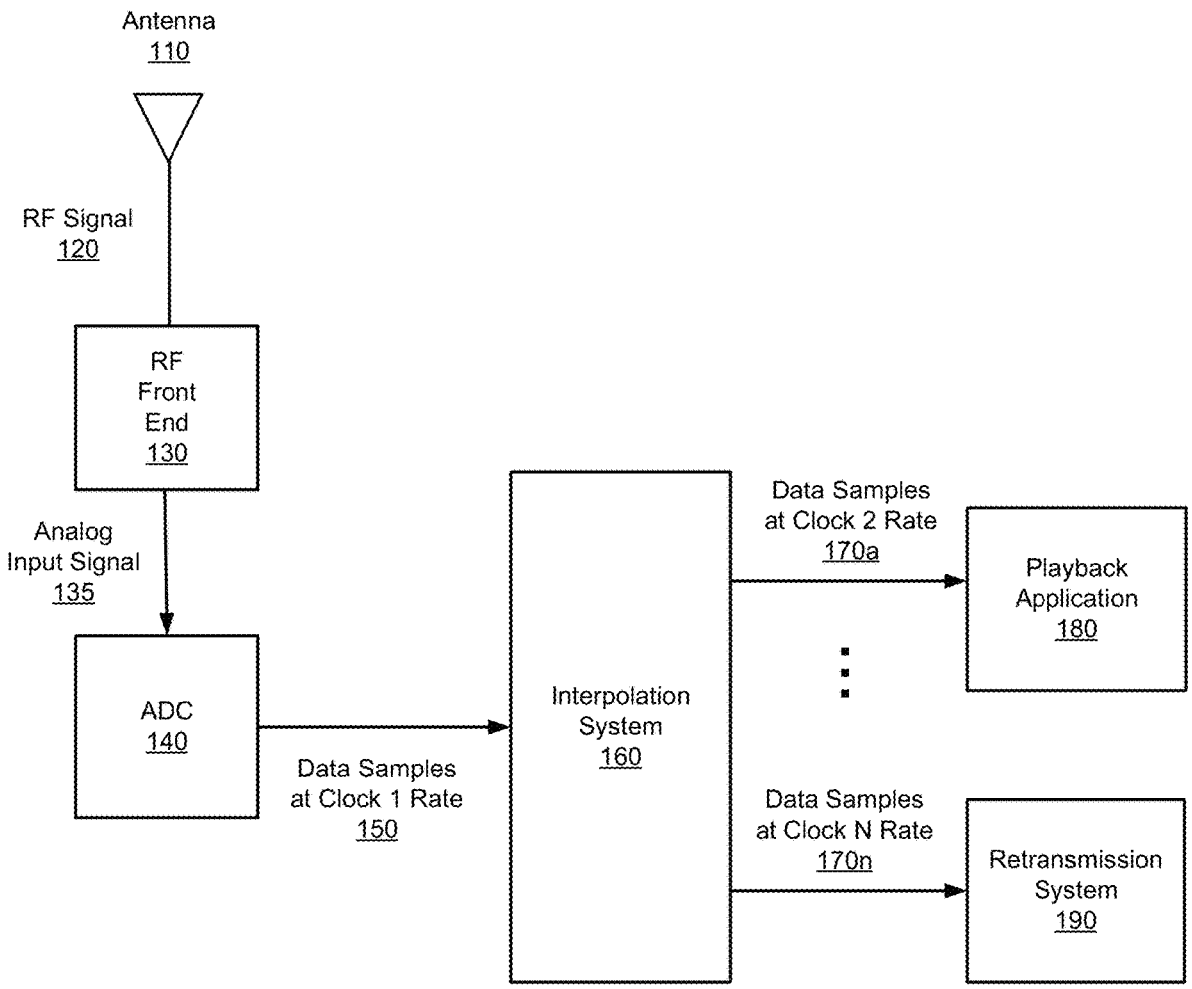
FIG. 1 illustrates an implementation of an interpolation system, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for non-integer interpolation. The techniques may be used, for example, to resample signals at asynchronous clock rates. As noted above, many applications, including radar receivers, electronic warfare (EW) systems, communication systems, and the like, receive input signals of interest and then digitize those signals at some desired or convenient sampling rate. These digitized signals may be stored for future use, passed along to other applications for additional processing, and/or retransmitted. Depending on the application it may be necessary to resample the signal at a different sampling rate. For example, a platform may employ a receiver system configured to operate at a first clock rate and a separate transmitter system configured to operate at a second clock rate. It may then be desired to retransmit the received signal through the transmitter which would require resampling and interpolation to convert the signal to the second clock rate. Resampling can be a complex and computationally expensive process when the resample rate is not an integer multiple of the original sampling rate.

To this end, and in accordance with an embodiment of the present disclosure, an interpolation system is disclosed which provides relatively efficient resampling and interpolation of a signal from a first clock rate to a second clock rate. The techniques are particularly advantageous when the second clock rate is not an integer multiple of the first clock rate. In some embodiments, the disclosed interpolation techniques include frequency domain interpolation of accumulated signal phase based on timing that dithers between a lower integer value and a higher integer value. The dithering occurs at times of phase alignment between the two clock rates and results in an average interpolation factor that can be a non-integer value, as will be described in greater detail below.

In accordance with an embodiment, the interpolation system includes a memory configured to store frequency values associated with an input signal sampled at a first clock rate. The system also includes a clock phase detector configured to detect phase alignment between a first clock signal associated with the first clock rate and a second clock signal associated with a second clock rate. The system further includes a read circuit configured to adjust an interpolation time interval in response to the detected phase alignment and to read the frequency values from the memory at the adjusted interpolation time interval. The system further includes a phase accumulator configured to accumulated phase as a sum of the frequency values read from the memory. The system further includes a waveform generator configured to generate an output waveform sample based on the accumulated phase.

A system to implement the disclosed techniques can be hosted on, or otherwise be incorporated into the electronic systems of an aircraft, a ground vehicle, a ship, a satellite, a personal computer, workstation, laptop computer, tablet, touchpad, portable computer, handheld computer, cellular telephone, smartphone, embedded system, or any other suitable platform where signals may be received and digitized.

It will be appreciated that the techniques described herein may provide improved performance with respect to non-integer interpolation, including lower cost and power consumption, compared to systems that require processors and memory to implement complex algorithms. However, the techniques disclosed herein may be implemented in hardware or software or a combination thereof depending on the suitability for any particular application. Numerous embodiments and applications will be apparent in light of this disclosure.

System Architecture

FIG. 1 illustrates an implementation 100 of an interpolation system 160, in accordance with certain embodiments of the present disclosure. The implementation 100 is shown to include a Radio Frequency (RF) receiver comprising an antenna 110 and an RF front end 130, an analog to digital converter (ADC) 140, an interpolation system 160, playback applications 180, and retransmission systems 190.

The RF receiver (e.g., antenna(s) 110 and an RF front end 130), is configured to receive signals of interest 120, for example signals in the RF band and convert them to an analog input signal 135. In some embodiments, the analog input signal 135 may be at an intermediate frequency (IF) band or at a baseband frequency. The analog input signal 135 is a complex valued frequency domain signal (or is converted to a complex valued frequency domain signal) comprising in-phase and quadrature (IQ) signal components.

The ADC 140 is configured to convert the analog input signal 135 to a sampled digital signal 150 comprising IQ data samples at a desired clock rate (e.g., an input signal rate associated with a first clock, clock 1).

The interpolation system 160 is configured to generate one or more versions 170a, . . . 170n of the digitized signal at various desired output signal rates (e.g., associated with clocks 2 through N) using interpolation techniques in the frequency domain, as described herein. In some embodiments, the clocks are asynchronous, and the output signal rates may be non-integer multiples of the input signal rate. For example, the input signal rate could be 100 MHz and the output signal rate could be 110 MHz.

The resampled and interpolated signals 170a, . . . 170n, may be used for any desired purpose. For example, playback applications 180 may be configured to playback the signal at some required clock rate, that differs from the input rate, for further analysis or processing. Likewise, retransmission system 190 may be configured to retransmit the signal at some required clock rate that differs from the input rate.

In some embodiments, the implementation 100 may be part of an EW platform, for example as a digital back end for an EW radar system. In such a system, multiple devices may be employed to cover larger frequency bands wherein each device collects data at different clock sampling rates. The disclosed interpolation techniques allow for the generation of a coherent signal that may be transmitted (e.g., as a response) from any of the devices.

Figure 2:
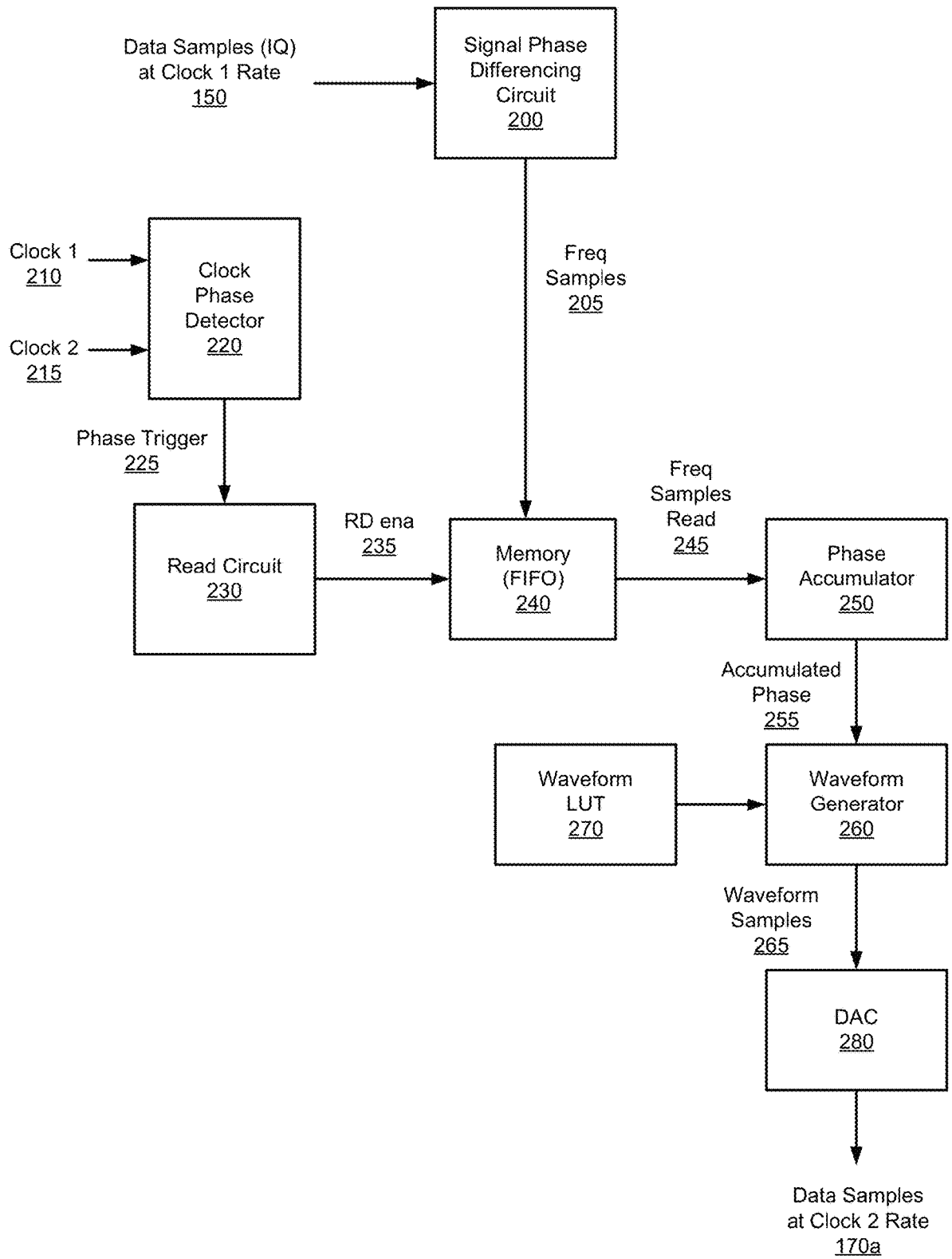
FIG. 2 is a block diagram of the interpolation system of FIG. 1, configured in accordance with certain embodiments of the present disclosure.

FIG. 2 is a block diagram of the interpolation system 160 of FIG. 1, configured in accordance with certain embodiments of the present disclosure. The interpolation system 160 is shown to include a signal phase differencing circuit 200, a clock phase detector 220, a read circuit 230, a memory 240, a phase accumulator 250, a waveform generator 260, a waveform lookup table (LUT) 270, and a digital to analog converter (DAC) 280.

The signal phase differencing circuit 200 is configured to generate frequency value samples 205 associated with data samples of the input signal 150. The input data samples 150 comprise IQ samples that were acquired at the first clock rate (e.g., the input clock rate). The phase value of each IQ sample may be defined as the Arctan (Q/I). The frequency value samples 205 are obtained by calculating the difference in phase between consecutive IQ samples 150 (i.e., frequency is defined as delta phase/time).

The memory 240 is configured to store the calculated frequency values 205. In some embodiments, the memory 240 may be implemented as a first-in-first-out (FIFO) memory and the FIFO output remains static until read enable signal 235 is applied. In some embodiments, the memory may be omitted and the frequency samples 205 may be provided to the phase accumulator through any suitable gating logic that controls the data flow based on the read enable signal 235, as explained below.

The clock phase detector 220 is configured to detect phase alignment between the first clock signal 210 (e.g., the input clock signal associated with the first clock rate) and a second clock signal 215 associated with a second clock rate (e.g., a desired output clock rate). The relationship between the two clocks is used to determine the interpolation factor (and associated interpolation time interval) which controls when frequency values 205 are read from memory 240. The interpolation time interval, as used herein, is defined as the interpolation factor multiplied by the duration of a cycle of the input clock (e.g., the input clock period). In some embodiments, the second clock rate is greater than first clock rate and the second clock rate is asynchronous with first clock rate. The clock phase detector 220 generates a phase trigger 225 when the clock signals align or walk through one another.

The read circuit 230 is configured to adjust an integer interpolation time interval in response to the detected phase alignment. The integer interpolation time interval will be described in greater detail below, but at a high level it results in modification or dithering of the sampling rate and provides associated interpolation of the signal to fit the new sampling rate. In some embodiments, the dithering adjustment of the integer interpolation time interval includes decreasing the interpolation time interval in response to the detected phase alignment. For example, when the faster clock walks through the slower clock, the interpolation time interval is decremented. The interpolation time interval may later be increased at a subsequent clock cycle of the first clock signal, such that the long term average of the interpolation time interval tracks with the desired non-integer interpolation, as will be described in greater detail below.

The read circuit 230 is further configured to read the frequency values 205 from the memory by providing a read enable signal 235 at the adjusted interpolation time interval so that read frequency samples 245 can be provided to the phase accumulator 250.

The phase accumulator 250 is configured to sum the frequency values 245 read from the memory to generate a phase 255 that accumulates over time (e.g., a phase ramp) as each new frequency value 245 is summed, at the interpolation time interval. As the read circuit holds the same frequency value 205 for multiple clock cycles, the phase ramp lengthens while maintaining the same slope. This effectively results in a linear interpolation of phase based on the delta-phase (or frequency) values. As the interpolation time intervals are dithered by the read circuit, each segment of the phase ramps also dithers in length resulting in a desired non-integer interpolation in the phase ramps.

Said differently, tracking of the alignment of the two clocks allows for addition or subtraction from the phase to maintain phase coherence, which is defined as a constant phase difference between each output. Although phase coherency can be lost in the short term, the disclosed techniques for dithering the interpolation factor allow phase coherency to be maintained on average over longer periods of time. This holds true because, even though some phase error may be introduced, the error is non-cumulative and averages out over time.

The waveform generator 260 is configured to generate output waveform samples 265 based on each new accumulated phase value 255. In some embodiments, the output waveform sample is generated as a sample of a sinusoidal waveform that is a function of the accumulated phase 255. In some embodiments, a waveform LUT 270 is configured to store samples of the sinusoidal waveform and the LUT can be indexed by the accumulated phase value 255. For example, the LUT 270 can provide a sinewave voltage value:

$$\text{sinewave voltage value} = \sin(\text{accumulated phase}/\text{input scaling}) * \text{output scaling}$$

where the input scaling and output scaling factors are applied to match the voltage to the LSB requirements and input range of the DAC 280.

The DAC 280 is configured to generate an analog output waveform based on the output waveform samples 265 which are provided at the second clock rate (e.g., the desired output clock rate).

Figure 3:
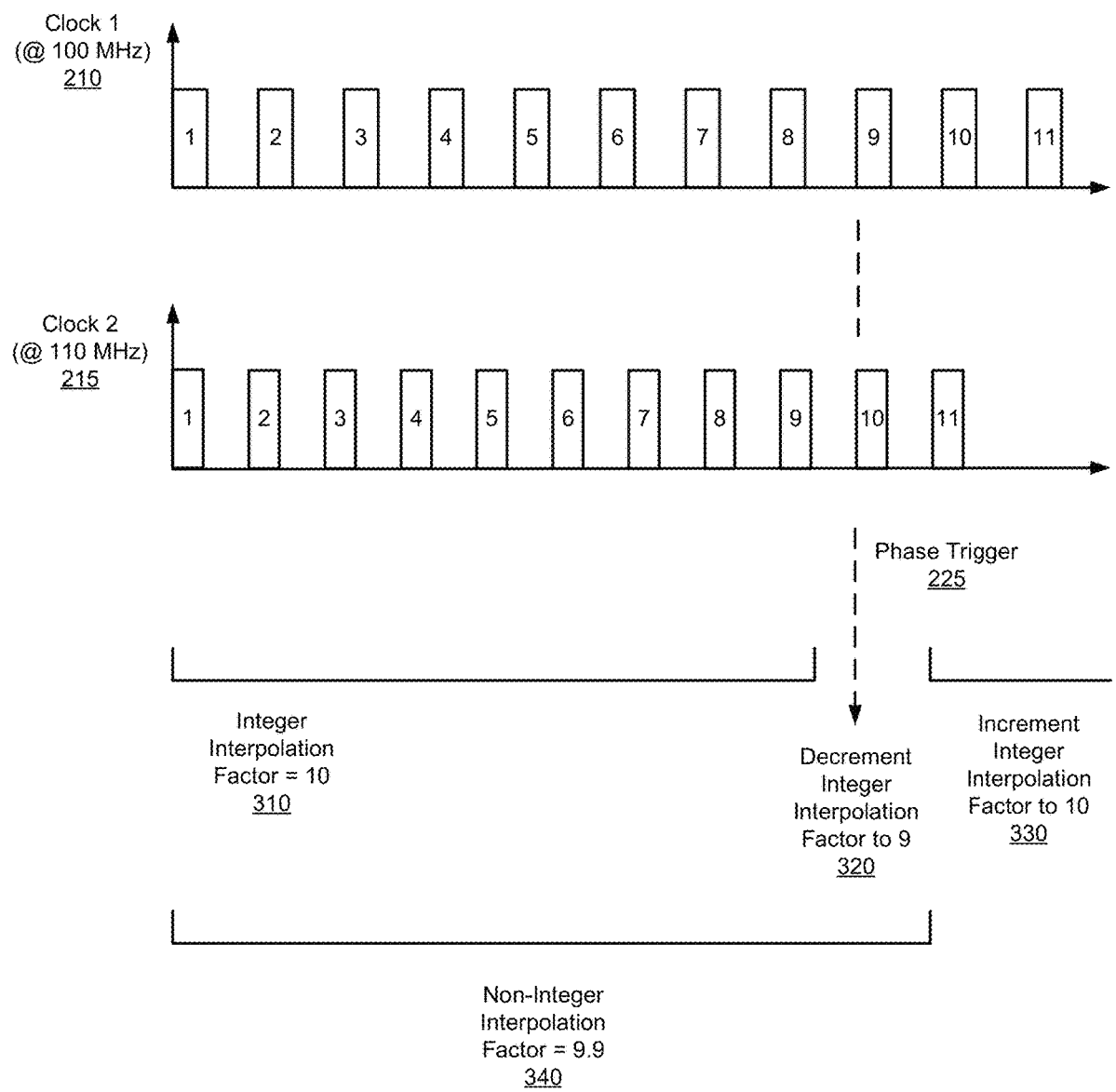
FIG. 3 illustrates adjustment of an interpolation factor, in accordance with certain embodiments of the present disclosure.

FIG. 3 illustrates adjustment 300 of an interpolation factor, in accordance with certain embodiments of the present disclosure. In this illustration, the input clock 210 at a 100 MHz rate is shown alongside a desired output clock 215 at a 110 MHz rate. An initial integer interpolation factor is set to ten 310. When clock 1 and clock 2 align (e.g., the ninth pulse of clock 1 with the tenth pulse of clock 2), the phase trigger 225 is generated and the integer interpolation factor is decremented to nine 320. On the following clock cycle, the integer interpolation factor is incremented back to ten 330. This results in an effective average non-integer interpolation factor 340 of 9.9 which is the desired value.

Although the initial integer interpolation factor in this example is set to ten, any value could be used for initialization since the system will stabilize to the correct average non-integer interpolation factor over time.

Figure 4:
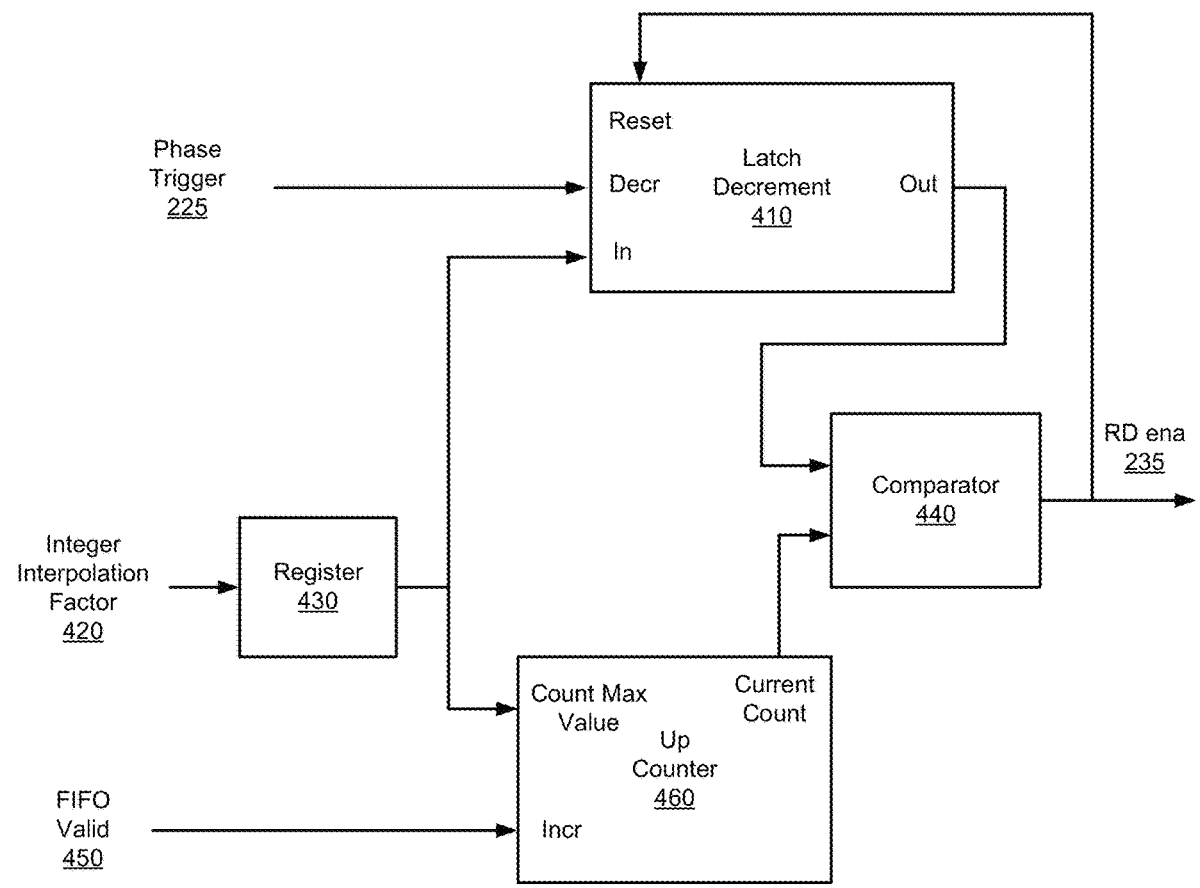
FIG. 4 is a block diagram of a read circuit of the interpolation system of FIG. 2, configured in accordance with certain embodiments of the present disclosure.

FIG. 4 is a block diagram of a read circuit 230 of the interpolation system of FIG. 2, configured in accordance with certain embodiments of the present disclosure. The read circuit 230 is shown to include a latch decrement circuit 410, a register 430, an up counter 460, and a comparator 440. The disclosed read circuit 230 illustrates one possible method for generating the read enable signal 235 in a manner that increases or decreases the interpolation factor depending on relative speed of the two clock signals.

The register 430 is configured to store a provided integer interpolation factor 420.

The up counter 460 is configured to count each FIFO valid signal 450 up to a maximum value set by the integer interpolation factor 420, provided by register 430. The counter then resets to zero on the next FIFO valid signal. The current count is provided to one leg of the comparator 440. In some embodiments, the FIFO is configured to provide the FIFO valid signal when valid data is available to be read from the FIFO.

The latch decrement circuit 410 is configured to decrement a latched copy of the integer interpolation factor 420, provided by register 430, on every received phase trigger 225. The decremented output is provided to the other leg of the comparator 440.

The comparator 440 is configured to generate the read enable signal 235 when the two inputs are equal. The read enable is also used to reset the latch decrement circuit back to the copy of the integer interpolation factor 420.

Methodology

Figure 5:
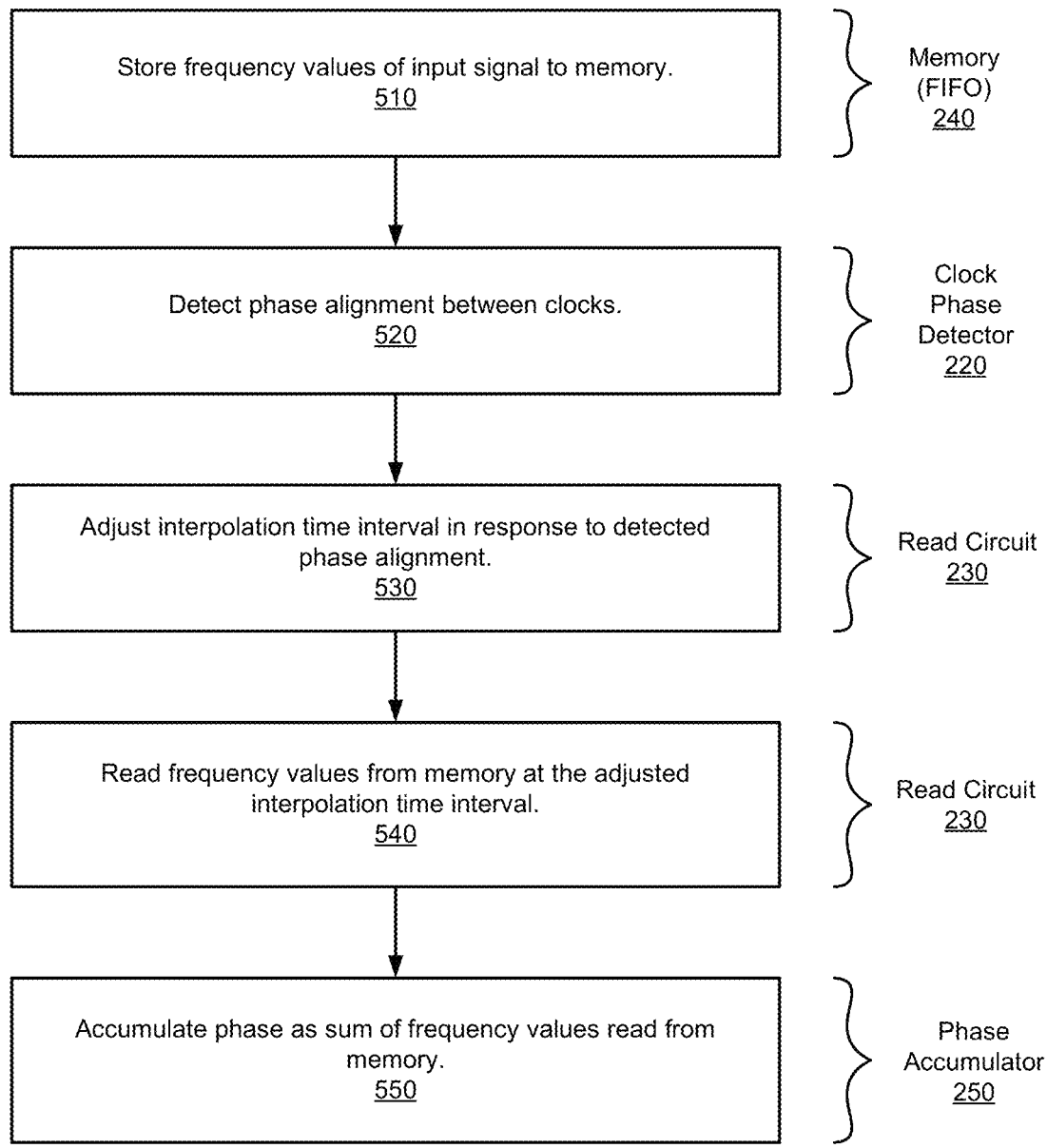
FIG. 5 is a flowchart illustrating a methodology for signal interpolation, in accordance with an embodiment of the present disclosure.

FIG. 5 is a flowchart illustrating a methodology 500 for signal interpolation, in accordance with an embodiment of the present disclosure. As can be seen, example method 500 includes a number of phases and sub-processes, the sequence of which may vary from one embodiment to another. However, when considered in aggregate, these phases and sub-processes form a process for operation of the signal interpolation system 160, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by storing frequency values associated with an input signal to a memory. The input signal is sampled at a first clock rate. In some embodiments, the memory is implemented as a FIFO. In some embodiments, the frequency values associated with the input signal are generated by calculating a phase difference between consecutive input in-phase and quadrature samples of the input signal.

At operation 520, phase alignment is detected between a first clock signal associated with the first clock rate and a second clock signal associated with a second clock rate. In some embodiments, the second clock rate is greater than first clock rate and the second clock rate is asynchronous with first clock rate.

At operation 530, an interpolation time interval is adjusted in response to the detected phase alignment. In some embodiments, the adjustment is to decrease the interpolation time interval in response to the detected phase alignment and to subsequently increase the interpolation time interval at a subsequent clock cycle of the first clock signal.

At operation 540, the frequency values are read from the memory at the adjusted interpolation time interval.

At operation 550, phase is accumulated as a sum of the frequency values read from the memory.

In some embodiments, additional operations may be performed, as previously described in connection with the system. For example, an output waveform sample is generated based on the accumulated phase. In some embodiments, the output waveform sample is generated as a sample of a sinusoidal waveform as a function of the accumulated phase. In some embodiments, the sample of a sinusoidal waveform is obtained from an LUT that is indexed by the accumulated phase value.

In some embodiments, a digital to analog conversion is performed to generate an analog output waveform based on the output waveform samples provided at the second clock rate.

Example System

Figure 6:
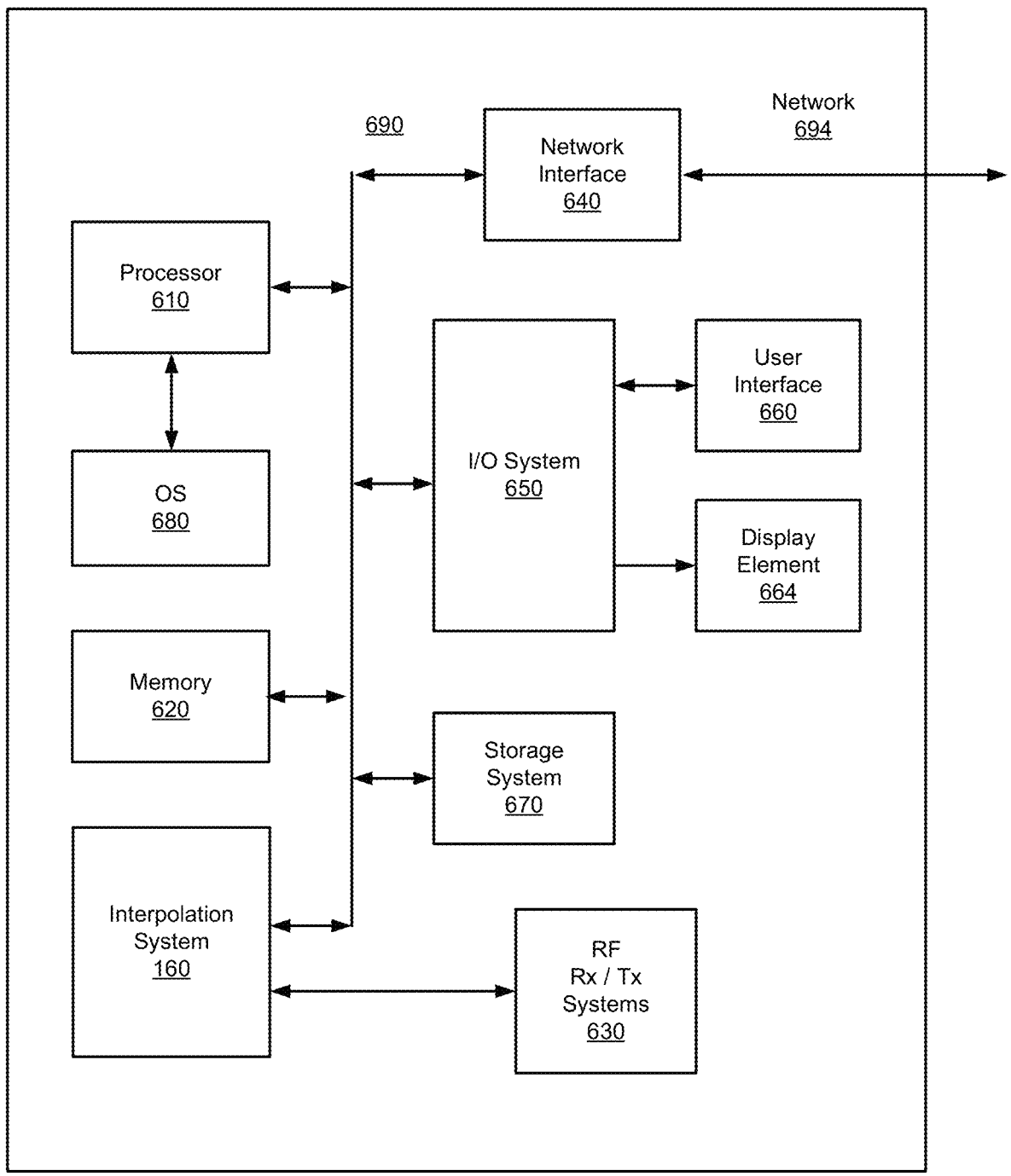
FIG. 6 is a block diagram of a processing platform configured to provide signal interpolation, in accordance with an embodiment of the present disclosure.

FIG. 6 is a block diagram of a processing platform 600 configured to provide signal interpolation, in accordance with an embodiment of the present disclosure. In some embodiments, platform 600, or portions thereof, may be hosted on, or otherwise be incorporated into the electronic systems of an aircraft, a ground vehicle, a ship, a tracking ground station, a personal computer, workstation, laptop computer, tablet, touchpad, portable computer, handheld computer, cellular telephone, smartphone, embedded system, or any other suitable platform where signals may be received and digitized. Any combination of different devices may be used in certain embodiments.

In some embodiments, platform 600 may comprise any combination of a processor 610, memory 620, an interpolation system 160, a network interface 640, an input/output (I/O) system 650, a user interface 660, a display element 664, a storage system 670, and RF receivers and transmitters 630. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 610 can be any suitable processor, and may include one or more coprocessors or controllers, such as an audio processor, a graphics processing unit, or hardware accelerator, to assist in the execution of mission software and/or any control and processing operations associated with platform 600, including control of the interpolation system 160. In some embodiments, the processor 610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multi-threaded cores in that they may include more than one hardware thread context (or "logical processor") per core. Processor 610 may be implemented as a complex instruction set computer (CISC) or a reduced instruction set computer (RISC) processor. In some embodiments, processor 610 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, cockpit display unit, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware or software.

Interpolation system 160 is configured to provide non-integer interpolation for sampling of signals at asynchronous clock rates, as described previously. Interpolation system 160 may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog, HDL, or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is an interpolation system comprising: a memory configured to store frequency values associated with an input signal, the input signal sampled at a first clock rate; a clock phase detector configured to detect phase alignment between a first clock signal associated with the first clock rate and a second clock signal associated with a second clock rate; a read circuit configured to adjust an interpolation time interval in response to the detected phase alignment and to read the frequency values from the memory at the adjusted interpolation time interval; and a phase accumulator configured to accumulate phase as a sum of the frequency values read from the memory.

Example 2 includes the system of Example 1, further comprising a waveform generator configured to generate an output waveform sample based on the accumulated phase.

Example 3 includes the system of Example 2, wherein the output waveform sample is generated as a sample of a sinusoidal waveform as a function of the accumulated phase.

Example 4 includes the system of any of Examples 1-3, further comprising a digital to analog converter configured to generate an analog output waveform based on the output waveform samples provided at the second clock rate.

Example 5 includes the system of any of Examples 1-4, wherein the adjustment is to decrease the interpolation time interval in response to the detected phase alignment and to subsequently increase the interpolation time interval at a subsequent clock cycle of the first clock signal.

Example 6 includes the system of any of Examples 1-5, wherein the second clock rate is greater than first clock rate and the second clock rate is asynchronous with first clock rate.

Example 7 includes the system of any of Examples 1-6, further comprising a signal phase differencing circuit configured to generate the frequency values associated with the input signal by calculating a phase difference between consecutive input in-phase and quadrature samples of the input signal.

Example 8 includes the system of any of Examples 1-7, wherein the memory is a first-in-first-out memory.

Example 9 is a method for signal interpolation, the method comprising: storing, by a processor-based system, frequency values associated with an input signal to a memory, the input signal sampled at a first clock rate; detecting, by the processor-based system, phase alignment between a first clock signal associated with the first clock rate and a second clock signal associated with a second clock rate; adjusting, by the processor-based system, an interpolation time interval in response to the detected phase alignment and reading the frequency values from the memory at the adjusted interpolation time interval; and accumulating, by the processor-based system, phase as a sum of the frequency values read from the memory.

Example 10 includes the method of Example 9, further comprising generating an output waveform sample based on the accumulated phase.

Example 11 includes the method of Example 10, wherein the output waveform sample is generated as a sample of a sinusoidal waveform as a function of the accumulated phase.

Example 12 includes the method of any of Examples 9-11, further comprising performing digital to analog conversion to generate an analog output waveform based on the output waveform samples provided at the second clock rate.

Example 13 includes the method of any of Examples 9-12, wherein the adjustment is to decrease the interpolation time interval in response to the detected phase alignment and to subsequently increase the interpolation time interval at a subsequent clock cycle of the first clock signal.

Example 14 includes the method of any of Examples 9-13, wherein the second clock rate is greater than first clock rate and the second clock rate is asynchronous with first clock rate.

Example 15 includes the method of any of Examples 9-14, further comprising generating the frequency values associated with the input signal by calculating a phase difference between consecutive input in-phase and quadrature samples of the input signal.

Example 16 is a computer program product including one or more non-transitory machine-readable mediums encoded with instructions that when executed by one or more processors cause a process to be carried out for signal interpolation, the process comprising: storing frequency values associated with an input signal to a memory, the input signal sampled at a first clock rate; detecting phase alignment between a first clock signal associated with the first clock rate and a second clock signal associated with a second clock rate; adjusting an interpolation time interval in response to the detected phase alignment and reading the frequency values from the memory at the adjusted interpolation time interval; and accumulating phase as a sum of the frequency values read from the memory.

Example 17 includes the computer program product of Example 16, wherein the process further comprises generating an output waveform sample as a sample of a sinusoidal waveform as a function of the accumulated phase.

Example 18 includes the computer program product of Examples 16 or 17, wherein the process further comprises performing digital to analog conversion to generate an analog output waveform based on the output waveform samples provided at the second clock rate.

Example 19 includes the computer program product of any of Examples 16-18, wherein the adjustment is to decrease the interpolation time interval in response to the detected phase alignment and to subsequently increase the interpolation time interval at a subsequent clock cycle of the first clock signal.

Example 20 includes the computer program product of any of Examples 16-19, wherein the second clock rate is greater than first clock rate and the second clock rate is asynchronous with first clock rate.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An interpolation system comprising:
a memory configured to store frequency values associated with an input signal, the input signal sampled at a first clock rate;
a clock phase detector configured to detect phase alignment between a first clock signal associated with the first clock rate and a second clock signal associated with a second clock rate;
a read circuit configured to adjust an interpolation time interval in response to the detected phase alignment and to read the frequency values from the memory at the adjusted interpolation time interval; and
a phase accumulator configured to accumulate phase as a sum of the frequency values read from the memory.

2. The system of claim 1, further comprising a waveform generator configured to generate an output waveform sample based on the accumulated phase.

3. The system of claim 2, wherein the output waveform sample is generated as a sample of a sinusoidal waveform as a function of the accumulated phase.

4. The system of claim 1, further comprising a digital to analog converter configured to generate an analog output waveform based on the output waveform samples provided at the second clock rate.

5. The system of claim 1, wherein the adjustment is to decrease the interpolation time interval in response to the detected phase alignment and to subsequently increase the interpolation time interval at a subsequent clock cycle of the first clock signal.

6. The system of claim 1, wherein the second clock rate is greater than first clock rate and the second clock rate is asynchronous with first clock rate.

7. The system of claim 1, further comprising a signal phase differencing circuit configured to generate the frequency values associated with the input signal by calculating a phase difference between consecutive input in-phase and quadrature samples of the input signal.

8. The system of claim 1, wherein the memory is a first-in-first-out memory.

9. A method for signal interpolation, the method comprising:
storing, by a processor-based system, frequency values associated with an input signal to a memory, the input signal sampled at a first clock rate;
detecting, by the processor-based system, phase alignment between a first clock signal associated with the first clock rate and a second clock signal associated with a second clock rate;
adjusting, by the processor-based system, an interpolation time interval in response to the detected phase alignment and reading the frequency values from the memory at the adjusted interpolation time interval; and
accumulating, by the processor-based system, phase as a sum of the frequency values read from the memory.

10. The method of claim 9, further comprising generating an output waveform sample based on the accumulated phase.

11. The method of claim 10, wherein the output waveform sample is generated as a sample of a sinusoidal waveform as a function of the accumulated phase.

12. The method of claim 9, further comprising performing digital to analog conversion to generate an analog output waveform based on the output waveform samples provided at the second clock rate.

13. The method of claim 9, wherein the adjustment is to decrease the interpolation time interval in response to the detected phase alignment and to subsequently increase the interpolation time interval at a subsequent clock cycle of the first clock signal.

14. The method of claim 9, wherein the second clock rate is greater than first clock rate and the second clock rate is asynchronous with first clock rate.

15. The method of claim 9, further comprising generating the frequency values associated with the input signal by calculating a phase difference between consecutive input in-phase and quadrature samples of the input signal.

16. A computer program product including one or more non-transitory machine-readable mediums encoded with instructions that when executed by one or more processors cause a process to be carried out for signal interpolation, the process comprising:
storing frequency values associated with an input signal to a memory, the input signal sampled at a first clock rate;
detecting phase alignment between a first clock signal associated with the first clock rate and a second clock signal associated with a second clock rate;

adjusting an interpolation time interval in response to the detected phase alignment and reading the frequency values from the memory at the adjusted interpolation time interval; and accumulating phase as a sum of the frequency values read from the memory.

17. The computer program product of claim 16, wherein the process further comprises generating an output waveform sample as a sample of a sinusoidal waveform as a function of the accumulated phase.

18. The computer program product of claim 16, wherein the process further comprises performing digital to analog conversion to generate an analog output waveform based on the output waveform samples provided at the second clock rate.

19. The computer program product of claim 16, wherein the adjustment is to decrease the interpolation time interval in response to the detected phase alignment and to subsequently increase the interpolation time interval at a subsequent clock cycle of the first clock signal.

20. The computer program product of claim 16, wherein the second clock rate is greater than first clock rate and the second clock rate is asynchronous with first clock rate.

\* \* \* \* \*